US008554891B2

(12) United States Patent  (10) Patent No.: US 8,554,891 B2
Capobianco  (45) Date of Patent: Oct. 8, 2013

(54) METHOD AND APPARATUS FOR PROVIDING FEEDBACK REGARDING DIGITAL CONTENT WITHIN A SOCIAL NETWORK

(75) Inventor: Anthony Capobianco, Cape Coral, FL (US)

(73) Assignees: Sony Corporation, Tokyo (JP); Sony Electronics Inc., Parkridge, NJ (US)

( * ) Notice: Subject to any disclaimer, the term of this patent is extended or adjusted under 35 U.S.C. 154(b) by 745 days.

(21) Appl. No.: 12/076,598

(22) Filed: Mar. 20, 2008

(65) Prior Publication Data

US 2009/0240771 A1   Sep. 24, 2009

(51) Int. Cl.
*G06F 15/173*   (2006.01)

(52) U.S. Cl.
USPC .......................... 709/223; 709/203; 709/217

(58) Field of Classification Search
USPC ................. 709/203, 206, 223, 224, 217, 219; 707/6; 705/14.66, 319
See application file for complete search history.

(56) References Cited

U.S. PATENT DOCUMENTS

| | | | | |
|---|---|---|---|---|
| 4,996,642 A * | 2/1991 | Hey | ................................ | 705/27 |
| 5,749,081 A * | 5/1998 | Whiteis | ........................ | 707/102 |
| 5,870,744 A * | 2/1999 | Sprague | ............................ | 707/9 |
| 5,884,282 A * | 3/1999 | Robinson | ........................ | 705/27 |
| 5,983,214 A * | 11/1999 | Lang et al. | ........................ | 707/1 |
| 6,266,649 B1 * | 7/2001 | Linden et al. | ................... | 705/26 |
| 6,317,722 B1 * | 11/2001 | Jacobi et al. | ............... | 705/14.51 |
| 6,438,579 B1 * | 8/2002 | Hosken | ........................ | 709/203 |
| 6,526,411 B1 * | 2/2003 | Ward | ............................. | 707/102 |
| 6,587,127 B1 * | 7/2003 | Leeke et al. | ................... | 715/765 |
| 6,606,624 B1 * | 8/2003 | Goldberg | ............................ | 707/6 |
| 6,655,963 B1 * | 12/2003 | Horvitz et al. | ................ | 434/236 |
| 6,681,247 B1 * | 1/2004 | Payton | ........................ | 709/217 |
| 6,912,505 B2 * | 6/2005 | Linden et al. | ............... | 705/14.53 |
| 6,963,850 B1 * | 11/2005 | Bezos et al. | .................... | 705/26 |
| 7,003,515 B1 * | 2/2006 | Glaser et al. | ........................ | 707/5 |
| 7,113,917 B2 * | 9/2006 | Jacobi et al. | ............... | 705/14.53 |
| 7,158,986 B1 * | 1/2007 | Oliver et al. | ................... | 707/102 |
| 7,222,085 B2 * | 5/2007 | Stack | ............................... | 705/10 |
| 7,231,419 B1 * | 6/2007 | Gheorghe et al. | ............. | 709/203 |
| 7,337,458 B2 * | 2/2008 | Michelitsch et al. | ........... | 725/46 |
| 7,359,894 B1 * | 4/2008 | Liebman et al. | ................... | 707/3 |
| 7,574,422 B2 * | 8/2009 | Guan et al. | ........................ | 707/2 |
| 7,584,171 B2 * | 9/2009 | Guan et al. | ........................ | 707/2 |
| 7,590,616 B2 * | 9/2009 | Guan et al. | ........................ | 707/2 |
| 7,730,216 B1 * | 6/2010 | Issa et al. | ........................ | 709/250 |
| 8,407,286 B2 * | 3/2013 | Punera et al. | ................. | 709/204 |

(Continued)

OTHER PUBLICATIONS

Harry Kautz, Bart Selman, and Mehul Shah. "Combining Social Networks and Collaborative Filtering", Communciations of the ACM, vol. 40, No. 3, Mar. 1997, pp. 63-65.*

(Continued)

*Primary Examiner* — Lashonda Jacobs
(74) *Attorney, Agent, or Firm* — Haverstock & Owens LLP

(57) ABSTRACT

Maintaining a social network and providing corresponding access to digital content. A social network includes at least one social group having a defined membership. The content items that collectively correspond to content resource devices of the group members are identified, and feedback information for the content items is maintained based upon feedback respectively provided by group members. The feedback includes ratings, amount of usage and recommendations of the content items. Members are then provided with displays wherein the feedback is conveyed in association with the corresponding content items.

21 Claims, 5 Drawing Sheets

(56) References Cited

U.S. PATENT DOCUMENTS

| | | | |
|---|---|---|---|
| 2002/0103746 A1* | 8/2002 | Moffett, Jr. | 705/37 |
| 2002/0199186 A1* | 12/2002 | Ali et al. | 725/28 |
| 2003/0105682 A1* | 6/2003 | Dicker et al. | 705/27 |
| 2004/0267604 A1* | 12/2004 | Gross | 705/10 |
| 2005/0159998 A1 | 7/2005 | Buyukkokten et al. | |
| 2005/0256756 A1* | 11/2005 | Lam et al. | 705/10 |
| 2006/0195362 A1* | 8/2006 | Jacobi et al. | 705/14 |
| 2006/0206478 A1* | 9/2006 | Glaser et al. | 707/5 |
| 2006/0212442 A1* | 9/2006 | Conrad et al. | 707/5 |
| 2006/0212444 A1* | 9/2006 | Handman et al. | 707/5 |
| 2006/0218153 A1* | 9/2006 | Voon et al. | 707/10 |
| 2006/0218225 A1* | 9/2006 | Hee Voon et al. | 709/201 |
| 2006/0259355 A1* | 11/2006 | Farouki et al. | 705/14 |
| 2006/0271620 A1* | 11/2006 | Beaty et al. | 709/203 |
| 2007/0028266 A1* | 2/2007 | Trajkovic et al. | 725/46 |
| 2007/0078849 A1* | 4/2007 | Slothouber | 707/5 |
| 2007/0129005 A1 | 6/2007 | Goldberg et al. | |
| 2007/0169165 A1* | 7/2007 | Crull et al. | 725/135 |
| 2007/0174389 A1 | 7/2007 | Armstrong et al. | |
| 2007/0174865 A1* | 7/2007 | Jing et al. | 725/28 |
| 2007/0198510 A1* | 8/2007 | Ebanks | 707/5 |
| 2008/0004941 A1 | 1/2008 | Calabria | |
| 2008/0004942 A1 | 1/2008 | Calabria | |
| 2008/0004943 A1 | 1/2008 | Calabria | |
| 2008/0004944 A1 | 1/2008 | Calabria | |
| 2008/0052371 A1* | 2/2008 | Partovi et al. | 709/217 |
| 2008/0077535 A1* | 3/2008 | Cannici | 705/80 |
| 2008/0104172 A1* | 5/2008 | Craig | 709/204 |
| 2008/0195480 A1 | 8/2008 | Calabria | |
| 2008/0294624 A1* | 11/2008 | Kanigsberg et al. | 707/5 |
| 2008/0301237 A1 | 12/2008 | Parsons et al. | |
| 2009/0070228 A1 | 3/2009 | Ronen | |
| 2009/0070700 A1 | 3/2009 | Johanson | |
| 2009/0100469 A1* | 4/2009 | Conradt et al. | 725/46 |
| 2009/0144392 A1 | 6/2009 | Wang et al. | |
| 2009/0144780 A1* | 6/2009 | Toebes et al. | 725/87 |
| 2009/0150786 A1* | 6/2009 | Brown | 715/733 |
| 2009/0164199 A1 | 6/2009 | Amidon et al. | |
| 2009/0316863 A1* | 12/2009 | Fitzsimmons | 379/88.11 |
| 2010/0228814 A1* | 9/2010 | McKenna et al. | 709/203 |
| 2011/0106597 A1* | 5/2011 | Ferdman et al. | 705/14.11 |
| 2011/0188415 A1* | 8/2011 | Graziano | 370/310 |

OTHER PUBLICATIONS

Aaditeshwar Seth. "Design of a Social Network Based Recommender System for Participatory Media Content", 2008, 6 pages.*

Paul Resnick and Hal R. Varian. "Recommnender Systems", Communication of the ACM, vol. 40, No. 3, pp. 56-58.*

Arianna Bassoli et al., tunA: Synchronised Music-Sharing on Handheld Devices, 2 pp, Human Connectedness Group, Media Lab Europe.

Bryan Ford et al., Persistent Personal Names for Globally Connected Mobile Devices, 3 pp., CSAIL Publications and Digital Archive, Research Abstracts—2007.

Bassoli, Arianna, et al., "Synchronised Music-Sharing on Handheld Devices" 2 pp, presented at UbiComp 2004 Sixth International Conference on Ubiquitous Computing, Nottingham, England, 7 to 10, Sep. 2004.

Ford, Bryan et al., Persistent Personal Names for Globally Connected Mobile Devices, 3 pp., CSAIL Publications and Digital Archive, Research Abstracts—2007 http://publications.csail.mit.edu/abstracts/abstracts07/baford/baford.html.

* cited by examiner

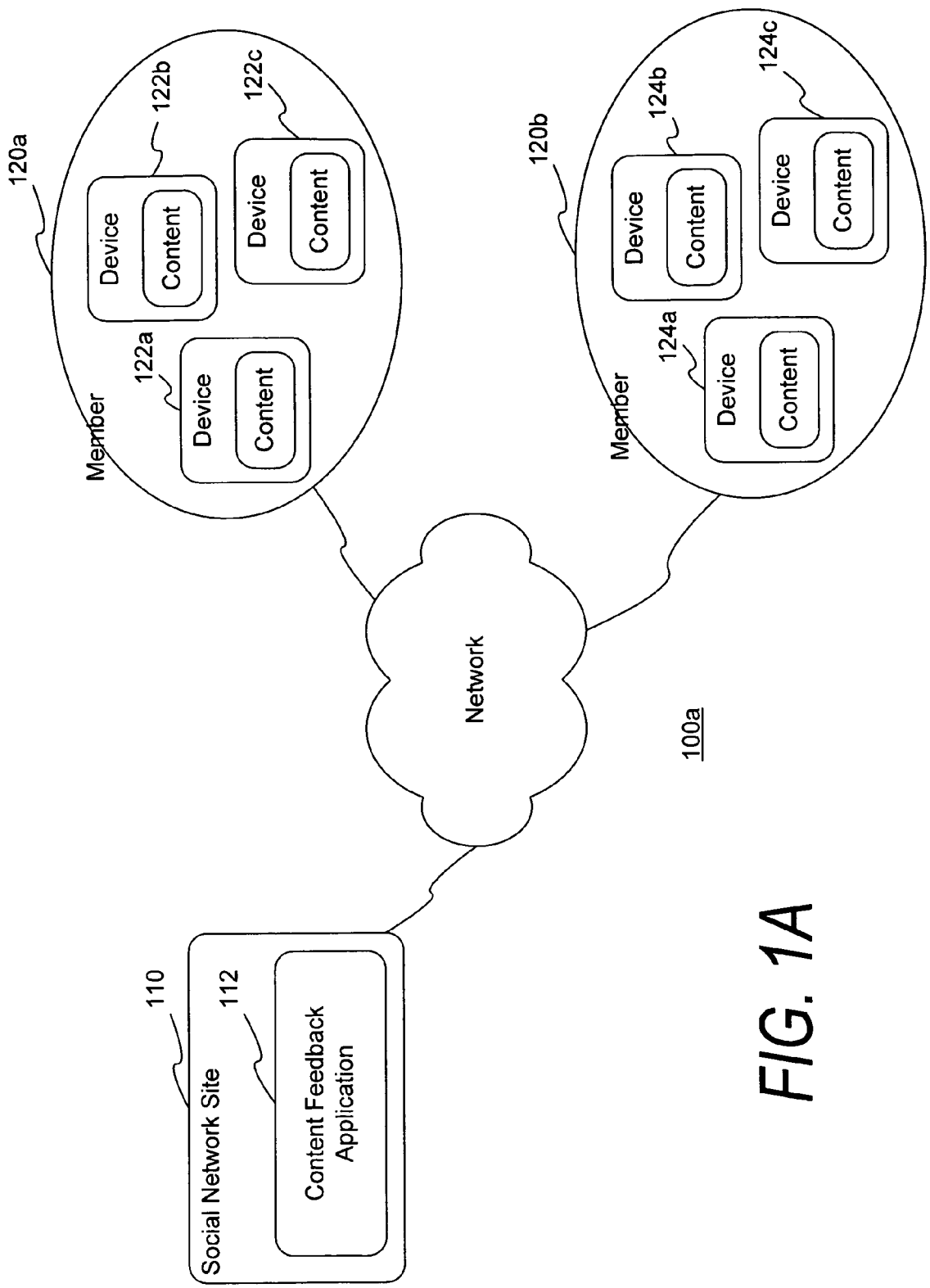

METHOD AND APPARATUS FOR PROVIDING FEEDBACK REGARDING DIGITAL CONTENT WITHIN A SOCIAL NETWORK

BACKGROUND OF THE INVENTION

1. Field of the Invention

This invention relates generally to sharing information within a social network and more particularly to methods and apparatus for providing feedback regarding digital content within a social network.

2. Description of the Related Art

As more and more different forms of digital content have become available for enjoyment through a multitude of different devices, it has become more difficult to manage such content. For example, a user may now have videos on various dedicated devices, cellular phones, personal computers, or other devices. Similarly, music may be available on a number of different user devices.

Additionally, individuals may have a sense of information overload due to the sheer volume of content that is potentially available for their enjoyment. It has become almost impossible to review every piece of digital content that is potentially available. Because of this, consumers waste time reviewing content that they are unlikely to enjoy, and miss opportunities to explore content that they may have enjoyed.

There remains a need for mechanisms that allow users to better organize their digital content, and to be made aware of content that may be recommended for their enjoyment.

Additionally, with the increasing distribution of content through computer networks in lieu of traditional forms, content providers have sought to adjust their business models to adjust for the erosion of traditional sales based upon such traditional forms. There remains a need for content providers and retailers to seek new revenue streams in light of this trend.

SUMMARY OF THE INVENTION

The present invention provides methods and apparatus for providing feedback regarding digital content within a social network.

According to one embodiment, maintaining a social network and providing corresponding access to digital content entails implementations wherein a social network having social groups that respectively engage in shared communications is organized. The social network includes at least one defined social group having a plurality of members. Identification of content items collectively corresponding to content resource devices of the plurality of members of the defined social group is provided, and then feedback information for the content items is maintained based upon feedback respectively provided by members of the defined social group in relation to the content items. This feedback information is then provided to members of the defined social group.

In one embodiment, the feedback may be in the form of quantitative ratings respectively associated with the plurality of content items. Alternatively, the feedback comprises a recommendation that is received from at least one of the members in the given defined social group, and the recommendation is forwarded to other members in the given defined social group. As another alternative, the feedback comprises a determination of the amount of usage of respective ones of the plurality of content items by the members in the given defined social group.

The feedback may also be solicited pursuant to an audition mode wherein a member of the defined social group specifically requests the feedback from other members of the defined social group for a particular content item.

A variety of content, such as video and music may be the content upon which feedback is maintained and provided. An interface may be provided, through which members of the given defined social group make selections of the plurality of content items for downloading from one or more other members of the given defined social group. Alternatively, an interface through which members of the given defined social group make selections of the plurality of content items for purchasing selected ones of the plurality of content items from an online resource may be provided.

The present invention can be embodied in various forms, including business processes, computer implemented methods, computer program products, computer systems and networks, user interfaces, application programming interfaces, and the like.

BRIEF DESCRIPTION OF THE DRAWINGS

These and other more detailed and specific features of the present invention are more fully disclosed in the following specification, reference being had to the accompanying drawings, in which:

FIG. 1A is a schematic diagram illustrating an environment in which providing feedback regarding digital content within a social network is provided.

DETAILED DESCRIPTION OF THE INVENTION

Figure 1B:
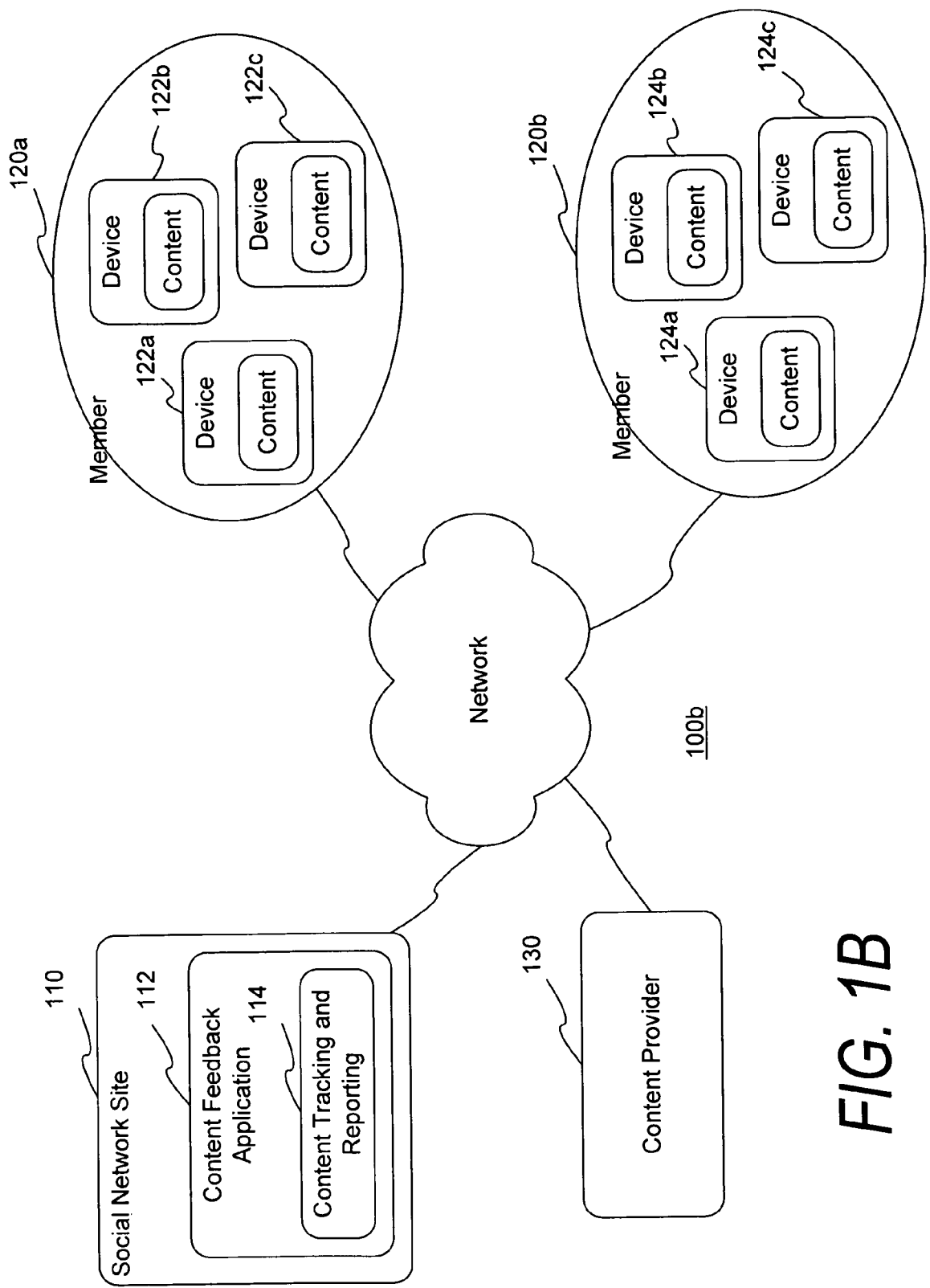
FIG. 1B is a schematic diagram illustrating an environment in which providing feedback regarding digital content within a social network is provided, with further indication of tracking and reporting content access in connection with a content provider.

In the following description, for purposes of explanation, numerous details are set forth, such as flowcharts and system configurations, in order to provide an understanding of one or more embodiments of the present invention. However, it is and will be apparent to one skilled in the art that these specific details are not required in order to practice the present invention.

FIG. 1A is a schematic diagram illustrating an environment 100a in which providing feedback regarding digital content within a social network is provided.

The content feedback application 112 accommodates a linking of the content available from various personal devices that users may have available within their home network 120a-b, or the like. Examples of such devices 122a-c, 124a-c include DVR (Digital Video Recorder), PVR (Personal Video Recorder), DMP (Digital Media Player), DMS (Digital Media Server), PMS (Personal Media Server), PMP (Personal Media Player), or any device configurable to store and/or play content including music and video content. Additionally, some devices may implement Internet or other network resources for storage, which means that the content may actually be stored in other locations.

FIG. 1A illustrates the linking of content and corresponding sharing through a social network 110. In one example, the social network 110 is a social network service as provided by a website. However, the social network may also be established through other means such as a cell phone, PMP or DVR. Any of these vehicles allow a user to be part of a defined social group.

In the example where the social network is provided through a website, various examples can be used including but not limited to MySpace, Facebook, YahooGroups, or others. Additionally a private arrangement involving shared web resources may allow a group of users to independently define a social network.

A user may interface with such a social network service using conventional Internet connections. Typically this may be done through a personal computer and conventional browsing. The content feedback application 112 is illustrated resident on the server-side, as part of the services provided by the social network site 110. However, it is noted that the functionality of linking the content on devices and allowing the group to provide feedback may be provided by server-side software, client-side software, or a combination thereof. To explain, some local software may be used on the client-side to link and organize the various content items of a given user, and this local client-side software may cooperate with server-side software in order to carry out the sharing with other group members. Alternatively, the functionality of linking and organizing the content may be primarily carried out with server-side software, with the various local devices connected to the network and independently reporting updates regarding available content to the server-side software. In addition to the content stored on local devices, content stored on the Internet or other resources may also be linked to the user (and then the group).

Regardless of how this is performed, the content from each member of a defined social group is collectively linked and organized. This allows the available content to be accessed, previewed, and potentially acquired by the various users in a defined social group. It also provides a platform through which feedback (ratings, usage metrics, etc.) is provided regarding the content that is collectively available from the group. The devices and corresponding content may be variously connected to interface with the content feedback application 112. For example, a home computer may implement a conventional broadband connection to Internet resources, and wireless or wired routing may be employed to make connections to devices that store the content within a home network.

By way of example, a user may link to a social networking site having the content feedback application 112. As such, their digital content devices such as DVR, PMP and other devices are linked to the site. Based on user preferences their circle of friends (selected or otherwise connected) would be alerted to new music or video that the user just watched or listened to. A user may be part of several groups, such as different groups based on content type, or separate business and personal groups.

The linking of such content allows an alert regarding recent additions to the user's music, video or audio libraries and offers the opportunity to buy, rent or otherwise access the same content. This takes the concept of informing friends about new content (books, CDs, movies, etc.) to the level of automatically alerting one or more defined social groups to which the user belongs. The scale of a social network and word of mouth advertising would grow accordingly—each time a member viewed that content their circle is potentially alerted.

With these connections and the corresponding linking of content, the content feedback application 112 variously organizes and provides a feedback platform for the content. In one aspect maintaining a social network and providing corresponding access to digital content entails organizing a social network wherein a plurality of defined social groups respectively engage in shared communications. The application 112 accesses the content resource devices that cumulatively correspond to members of defined social groups. Thus, for example, members in a given defined social group may respectively review content items that are collectively sourced by all of the content resource devices of the members in the given defined social group. Through the platform of the defined social group, the application 112 provides opportunities to review new content and provide feedback regarding content.

In this fashion, the members of the social group are invited to access the content items of the group for enjoyment or to provide corresponding feedback. Various feedback may be provided. For example, the feedback may comprise quantitative ratings respectively associated with the content items, such as a numerical (e.g., 1-5) rating or the like. This allows the feedback to be organized into a group rating reflective of the collective feedback of the members (e.g., averaging, etc.).

The feedback may also be provided in the form of a recommendation. As such, a member may specifically recommend new content to other group members.

Still further, the feedback may be provided depending upon usage. Usage may be reported by devices to the content feedback application. Listings may then be provided regarding which content has been viewed or listened to most frequently over a recent time period. This allows the members of the group to keep apprised regarding recently popular content.

Auditions may also be supported by the content feedback application 112. In this mode, a member may solicit feedback regarding a particular piece of content. In this mode, the content is identified and a message may be provided soliciting the feedback. The message may be active or passive. An example of an active message is an e-mail or other communication specifically requesting the feedback. Alternatively, the solicitation may be passively provided, wherein the next time a group member logs on to the social network site they are invited to review and provide feedback. These mechanisms may also be used to keep the membership regularly aware of new content items, even where this type of feedback is not solicited.

The actual access to the content may be from the member devices, or through separate channels. For example, while one member may have content on their DVR, a preview or other access of the content may be through a separate online resource (e.g., content provider or retailer). In this mode, the content may be uniquely identified and reported to the content provider or retailer to further preview or purchase the material.

Alternatively, the group members may actually access the content from the devices of the other group members. There, the members may be pier-to-pier connected for a download or streamed access to the content items, or the social network site may facilitate the same.

Some form of tracking and reporting may be provided regarding the distribution of the content, if desired. This may allow the group members to take advantage of collective bargaining power in accessing content. For example, the group members may collectively participate in a subscription model for accessing and/or acquiring content at group rates that are lower than they would pay as individuals. The tracking and reporting model also allows content providers to better understand the market and corresponding content usage.

FIG. 1B is a schematic diagram illustrating an environment 100b in which providing feedback regarding digital content within a social network is provided, with further indication of content tracking and reporting 114 by the content feedback application 112. The tracking and reporting of content may be performed in conjunction with content provider(s) 130 that source the content to the members of the defined social groups, with group identifiers being used to associate usage to the group members. Various models may be applied to the benefit of the group members in such an arrangement. For example, the group may enjoy a monthly content access fee that is shared by the group to lower individual costs. Alternatively, individual downloads of content may be made available at a discounted group rate. These and other group benefits may be made available to the group membership. Content providers also benefit through increased content distribution alternatives.

Figure 2A:
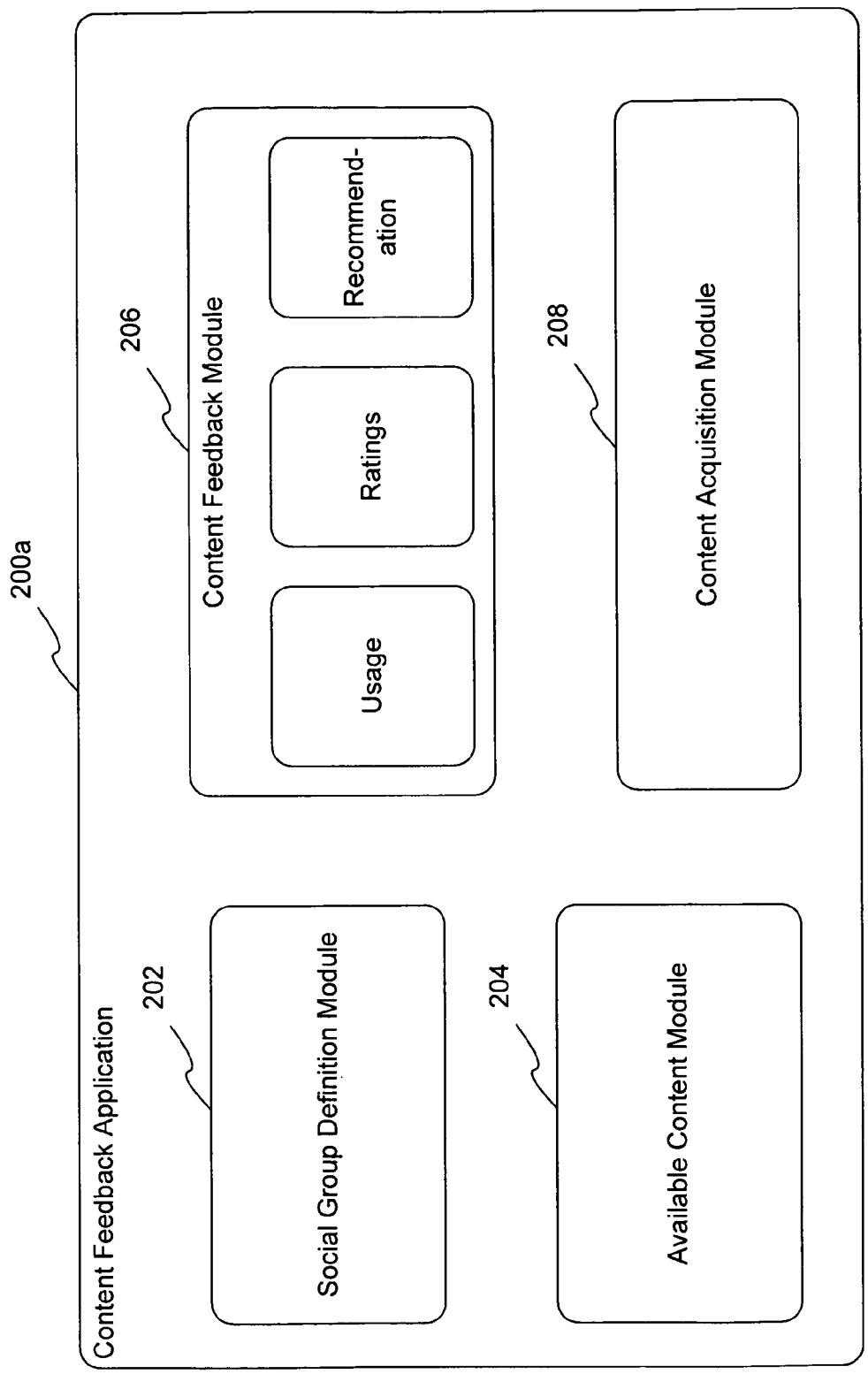
FIG. 2A is a block diagram illustrating an example of a content feedback application.

FIG. 2A is a block diagram illustrating an example of a content feedback application 200a. The content feedback application 200a is preferably provided as software, but may alternatively be provided as hardware or firmware, or any combination of software, hardware or firmware. The software is stored in memory and may be executed on any processing device including but not limited to the server and/or client devices previously described. Although one modular breakdown of the content feedback application 200a is illustrated, it is noted that the described functionality may be provided using fewer, greater, or differently named modules.

The content feedback application includes a social group definition module 202, an available content module 204, a content feedback module 206 and a content acquisition module 208.

The social group definition module 202 stores information defining one or more social groups. In the case of notable online social network services there may be many thousands of groups. In the case of software that separately organizes a private group as little as one group may be organized. The social group definition module 202 may employ login credentials (e.g., user name and password) to register and authenticate access, and may also implement cookie or related technology so as to automatically recognize access by a device corresponding to a member. Each member is preferably uniquely identified, but there may also be corresponding group identifiers that allow members to be correlated to multiple different groups (e.g., separate personal and business groups as noted).

The content-playing devices of members may also be registered in association with individual members. These may be personal computer(s), corresponding home network devices, cellular phones, or other devices as described. Preferably, interfaces are provided so that the user can manage the devices that are recognized by the content feedback application 200a.

Additionally, the content corresponding to a member may be organized into a listing that is variously accessible for content management. For example, the listing may be tabulated according to content type (e.g., music, movies, photos), with corresponding indication of which device(s) store or have access to the content, and the ability to filter the display such as by artist, title, or other keywords.

The available content module 204 organizes the content collectively corresponding to the defined social group(s). For a given social group this entails an accumulation of the information corresponding to the individual member's content as described in connection with the social group definition module 204 as described above.

The available content that is displayed in association with access by a particular member is also preferably filtered so that the member is not inundated with stale or duplicative content items. For example, the cumulative listing may be only content items that have been used or recommended by a group member within a predetermined time frame (e.g., the last month, etc.). Additionally, a given content item that is recommended or used by many different users is preferably not listed repeatedly. Rather, a single listing may be employed with an indication of the extent of usage indicated in association with the listing. For example, the listing may indicate "85 of 100 group members have used/recommend this item", etc.

The content feedback module 206 is in operative communication with the available content module 204 and organizes the solicitation and receipt of feedback regarding various content items. As described previously, a variety of feedback may be obtained, maintained and reported to the membership to assist in their evaluation and review of content items. The illustrated feedback functions include usage, ratings and recommendation modules.

The usage of content items may be tracked and reported to members. When a content item that has been registered with the content feedback application 200a is played (e.g., a music item is listened to, or a movie is watched), a reporting mechanism may be employed so that the extent group usage may be evaluated. In this fashion, a member may become quickly aware of content that is currently popular. The reporting mechanism may merely be a content identifier that is sent to the content feedback module 206.

This usage reporting may be rendered anonymously if desired. That is, the overall usage of content items by the group may be displayed for review by individual members, but the information may be filtered so that it is not evident which individual is using particular content.

The ratings function is based upon ratings that are actively provided by members of the defined social group. Preferably, some form of standardized, quantitative mechanism, such as a numerical rating, is applied for uniformity. The ratings function collects the ratings provided by members and offers corresponding reports regarding content items. The ratings information may also be provided in association with the usage information, or may be provided separately. As with other criteria, the available content module 204 is provided with this information so that the available content may be filtered and displayed to the user/member accordingly. That is, if the member wants to review only content having a certain quantitative rating and with a certain level of usage, corresponding displays of content items meeting the desired criteria are provided.

The recommendation function allows a member to particularly recommend a given content item. This allows the member to provide a level of notoriety outside the context of the ratings scheme, for an item that is believed to merit special attention. The recommended content item may also be actively presented to the other members, whereas general usage and ratings may more typically be presented based upon review of content as described. The message regarding the recommended content item may be variously conveyed, such as by separate messages or by a notable display provided by a personalized web page through which the content feedback application 200a interfaces with users.

The content acquisition module 208 provides information that allows members to acquire access to content items following review of the available content. This may be in the form of determining which group member devices are currently accessible to obtain the content items. Alternatively, separate providers (e.g., an online content provider or online retailer) may be employed to obtain the content. Content identifiers may be used in association with content items so that the availability of such content items may be explored with such alternative content providers. For certain media, this may be accommodated by noting a digital fingerprint associated with the content. Alternatively a unique identifier may be associated with content independently of such identification. Still further, keyword based searching or the like based upon title or authorship may be employed.

If desired, the content acquisition module 208 may enforce digital rights management (DRM) requirements in determining the propriety of access to content items.

Figure 2B:
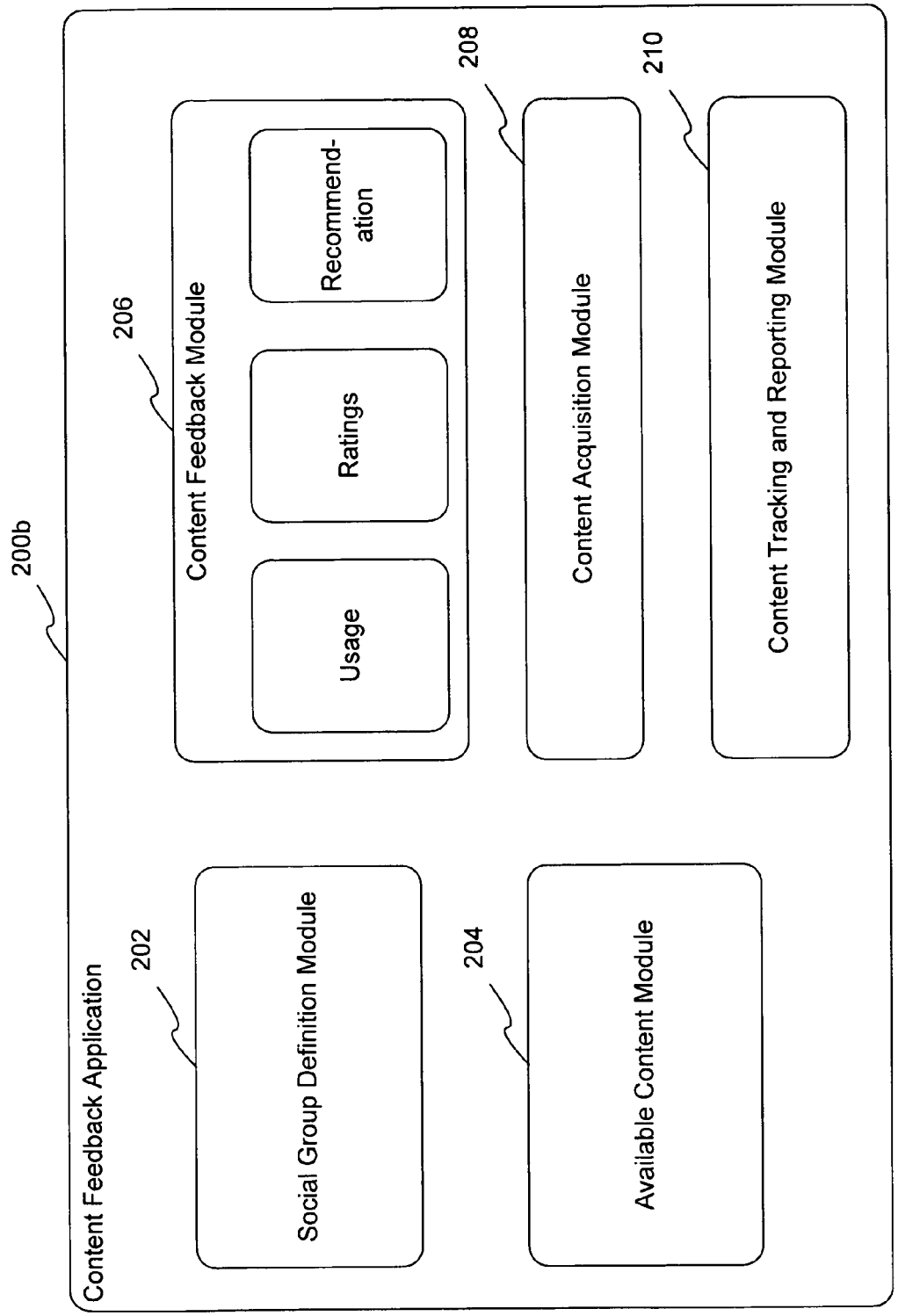
FIG. 2B is a block diagram illustrating an example of a content feedback application having a content tracking and reporting module.

FIG. 2B is a block diagram illustrating an example of a content feedback application 200b having a content tracking and reporting module 210, which allows tracking and reporting regarding the distribution and/or usage of content to be employed, if desired. In some environments, it may be desirable to allow the group members to take advantage of collective bargaining power in accessing content. For example, the group members may collectively participate in a subscription model for accessing and/or acquiring content at group rates that are lower than they would pay as individuals. The tracking and reporting module 210 allows the provision of information regarding content usage and distribution in connection with such an arrangement.

For example, the tracking and reporting of content may be performed in conjunction with content provider(s) that source the content to the members of the defined social groups, with the described group identifiers being used to associate usage to the group members. Various models may be applied to the benefit of the group members in such an arrangement. For example, the group may enjoy a monthly content access fee that is shared by the group to lower individual costs. Alternatively, individual downloads of content may be made available at a discounted group rate.

Figure 3:
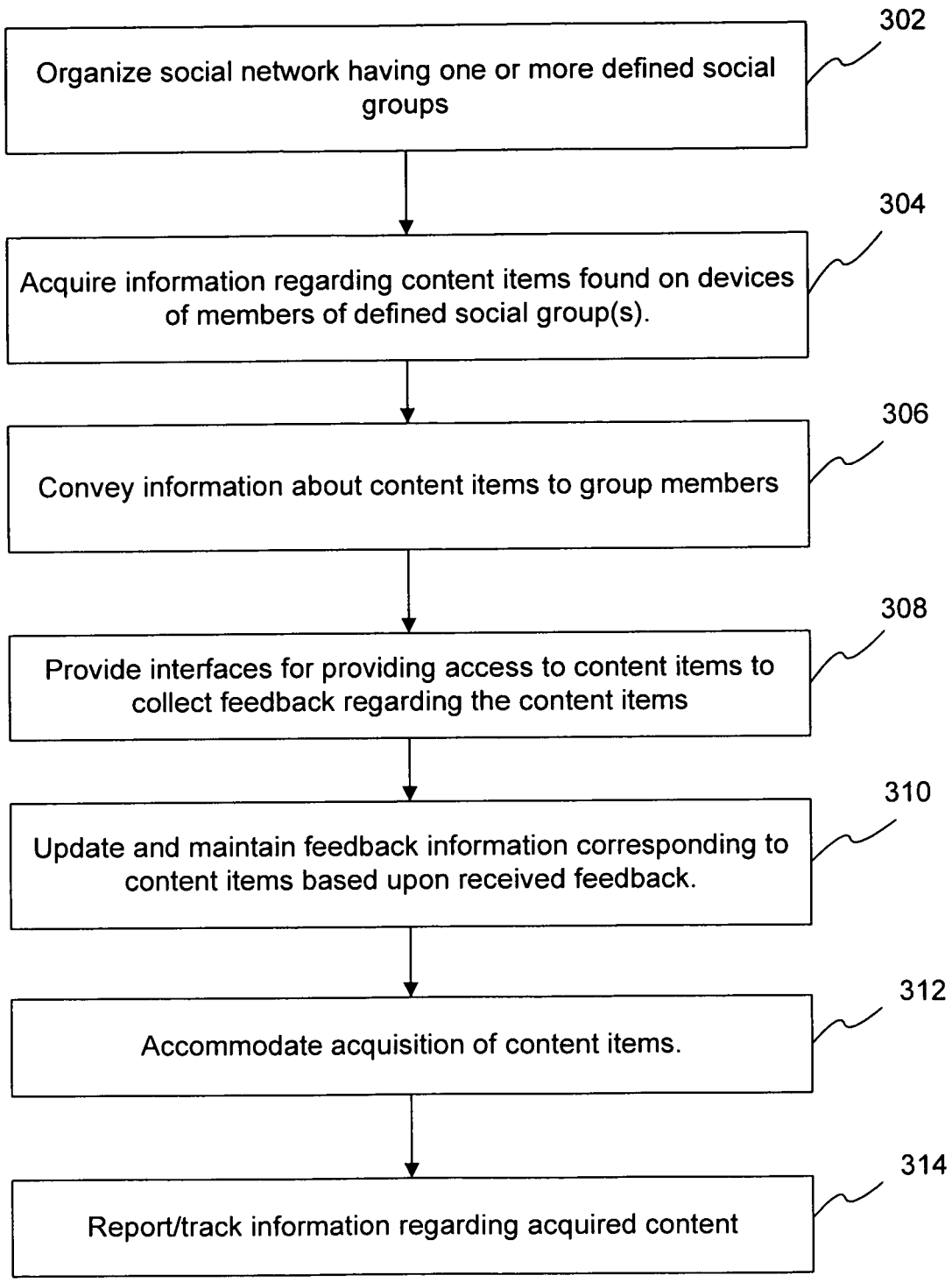
FIG. 3 is a flow diagram illustrating a method of providing feedback regarding digital content within a social network.

FIG. 3 is a flow diagram illustrating a method 300 of providing feedback regarding digital content within a social network.

The method relies upon an organization 302 of a social network having one or more defined social groups as described. Through connections made to the content feedback application, information is acquired 304 regarding the content items found of devices of members of the defined social group(s), and information about the collective content items is conveyed 306 to the group membership.

Interfaces are provided 308 in order to review the available content items, provide access to such content items, and to collect feedback regarding the content items. As noted, various forms of feedback may be provided; including but not limited to quantitative ratings and the amount of usage of content items by the group members. Additionally, specific recommendations for particular content items may be made.

The content feedback application updates and maintains 310 the information about all forms of feedback and conveys such information to group members. This allows provision of filtered offerings to the users based upon the collective content items of the group members, with indication of which content items are currently popular or highly rated.

Once a user/member reviews content items, they are also accommodated 312 with the opportunity to acquire content items. This may be in the form of accessing the content item from the device of another member of the defined social group, or alternatively resources such as online content providers or retailers may be employed. Reporting and tracking 314 of information about content usage allows the group membership to participate in arrangements wherein the group acquires content, potentially at discounted group rates or the like.

Thus embodiments of the present invention produce and provide methods and apparatus for providing feedback regarding digital content within a social network environment. Although the present invention has been described in considerable detail with reference to certain embodiments thereof, the invention may be variously embodied without departing from the spirit or scope of the invention. Therefore, the following claims should not be limited to the description of the embodiments contained herein in any way.

The invention claimed is:

1. A computer implemented method for maintaining a social network and providing corresponding access to digital content, the computer implemented method comprising:
   organizing, by a computer, a social network wherein social groups respectively obtain a collective bargaining power based on usage of the social network by a respective social group and engage in shared communications, the social network comprising at least one defined social group having a plurality of members;
   identifying, by a computer, a plurality of content items collectively corresponding to content resource devices of the plurality of members of the defined social group, said content resource devices being separate from computing devices used by the plurality of members to access the social network;
   maintaining, by a computer, feedback information for the plurality of content items based upon feedback respectively provided by members of the defined social group in relation to the plurality of content items;
   providing, by a computer, the feedback information for the plurality of content items to members of the defined social group; and
   reporting, by a computer, acquisition of respective items of the plurality of content items by members of the given defined social group to an online resource, said acquisition of respective items being acquired through a discounted access negotiated by the collective bargaining power by members of the given defined social group,
   wherein said usage of the social network is defined by an amount of feedback information for the plurality of content items, and
   wherein the collective bargaining power is a subscription model for acquiring content through the discounted access, and wherein the discounted access comprises a discounted rate or a group rate that is lower than an individual rate.

2. The computer implemented method of claim 1, wherein the feedback information further comprises quantitative ratings respectively associated with the plurality of content items.

3. The computer implemented method of claim 1, wherein the feedback information further comprises a recommendation that is received from at least one of the members in the given defined social group, and the recommendation is forwarded to other members in the given defined social group.

4. The computer implemented method of claim 1, wherein the feedback information further comprises a determination of the amount of usage of respective items of the plurality of content items by members in the given defined social group.

5. The computer implemented method of claim 1, wherein the feedback information is solicited pursuant to an audition mode wherein a member of the defined social group specifically requests the feedback information from other members of the defined social group for a particular content item.

6. The computer implemented method of claim 1, further comprising:
   providing, by a computer, an interface through which members of the given defined social group make selections of the plurality of content items for downloading from one or more other members of the given defined social group.

7. The computer implemented method of claim 1, further comprising:
providing, by a computer, an interface through which members of the given defined social group make selections of the plurality of content items for purchasing selected items of the plurality of content items from an online resource.

8. The computer implemented method of claim 1, wherein the plurality of content items comprise music content.

9. The computer implemented method of claim 1, wherein the plurality of content items comprise video content.

10. A system for maintaining a social network and providing corresponding access to digital content, the system comprising:
means for organizing a social network wherein social groups respectively obtain a collective bargaining power based on usage of the social network by a respective social group and engage in shared communications, the social network comprising at least one defined social group having a plurality of members;
means for identifying a plurality of content items collectively corresponding to content resource devices of the plurality of members of the defined social group, said content resource devices being separate from computing devices used by the plurality of members to access the social network;
means for maintaining feedback information for the plurality of content items based upon feedback respectively provided by members of the defined social group in relation to the plurality of content items; and
means for providing the feedback information for the plurality of content items to members of the defined social group; and
means for reporting, by a computer, acquisition of respective items of the plurality of content items by members of the given defined social group to an online resource, said acquisition of respective items being acquired through a discounted access negotiated by the collective bargaining power by members of the given defined social group,
wherein said usage of the social network is defined by an amount of feedback information for the plurality of content items, and
wherein the collective bargaining power is a subscription model for acquiring content through the discounted access, and wherein the discounted access comprises a discounted rate or is a group rate that is lower than an individual rate.

11. The system of claim 10, wherein the feedback information comprises quantitative ratings respectively associated with the plurality of content items.

12. The system of claim 10, wherein the feedback information comprises a recommendation that is received from at least one of the members in the given defined social group, and the recommendation is forwarded to other members in the given defined social group.

13. The system of claim 10, wherein the feedback information further comprises a determination of the amount that members in the given defined social group use respective items of the plurality of content items.

14. The system of claim 10, wherein the feedback information is solicited pursuant to an audition mode wherein a member of the defined social group specifically requests the feedback from other members of the defined social group for a particular content item.

15. A computer program product for maintaining a social network and providing corresponding access to digital content, the computer program product comprising a non-transitory computer readable medium having program code stored thereon, the program code being executable by a computer to perform operations comprising:
organizing, by a computer, a social network wherein social groups respectively obtain a collective bargaining power based on usage of the social network by a respective social group and engage in shared communications, the social network comprising at least one defined social group having a plurality of members;
identifying, by a computer, a plurality of content items collectively corresponding to content resource devices of the plurality of members of the defined social group;
maintaining, by a computer, the feedback information for the plurality of content items based upon feedback respectively provided by members of the defined social group in relation to the plurality of content items;
providing, by a computer, the feedback information for the plurality of content items to members of the defined social group; and
reporting, by a computer, acquisition of respective items of the plurality of content items by members of the given defined social group to an online resource, said acquisition of respective items being acquired through a discounted access negotiated by the collective bargaining power by members of the given defined social group,
wherein said usage of the social network is defined by an amount of feedback information for the plurality of content items, and
wherein the collective bargaining power is a subscription model for acquiring content through the discounted access, and wherein the discounted access comprises a discounted rate or is a group rate that is lower than an individual rate.

16. The computer program product of claim 15, wherein the feedback information comprises quantitative ratings respectively associated with the plurality of content items.

17. The computer program product of claim 15, wherein the feedback information comprises a recommendation that is received from at least one of the members in the given defined social group, and the recommendation is forwarded to other members in the given defined social group.

18. The computer program product of claim 15, wherein the feedback information by a computer further comprises a determination of the amount of usage of respective items of the plurality of content items by members in the given defined social group.

19. The computer program product of claim 15, wherein the feedback information is solicited pursuant to an audition mode wherein a member of the defined social group specifically requests the feedback from other members of the defined social group for a particular content item.

20. The computer program product of claim 15, further comprising:
providing an interface through which members of the given defined social group make selections of the plurality of content items for downloading from one or more other members of the given defined social group.

21. The computer program product of claim 15, further comprising:
providing an interface through which members of the given defined social group make selections of the plurality of content items for purchasing selected ones of the plurality of content items from an online resource.

* * * * *